(12) United States Patent
Pavarini

(10) Patent No.: US 12,510,393 B2
(45) Date of Patent: Dec. 30, 2025

(54) SYSTEM FOR MEASURING THE FLOW RATE OF A FLUID MEDIUM

(71) Applicant: ARAG S.R.L., Rubiera (IT)

(72) Inventor: Giuliano Pavarini, Carpi (IT)

(73) Assignee: ARAG S.R.L., Rubiera (IT)

( * ) Notice: Subject to any disclaimer, the term of this patent is extended or adjusted under 35 U.S.C. 154(b) by 312 days.

(21) Appl. No.: 18/025,553

(22) PCT Filed: Sep. 9, 2021

(86) PCT No.: PCT/IB2021/058206
§ 371 (c)(1),
(2) Date: Mar. 9, 2023

(87) PCT Pub. No.: WO2022/053970
PCT Pub. Date: Mar. 17, 2022

(65) Prior Publication Data
US 2023/0341249 A1    Oct. 26, 2023

(30) Foreign Application Priority Data
Sep. 10, 2020   (IT) .................. 102020000021415

(51) Int. Cl.
*G01F 7/00* (2006.01)
*G01F 1/58* (2006.01)
*G01F 15/00* (2006.01)
*A01C 23/00* (2006.01)

(52) U.S. Cl.
CPC ............... *G01F 7/00* (2013.01); *G01F 1/58* (2013.01); *G01F 15/003* (2013.01); *G01F 15/005* (2013.01); *A01C 23/007* (2013.01)

(58) Field of Classification Search
CPC ... G01F 7/00; G01F 7/005; G01F 1/58; G01F 1/586; G01F 1/1588; G01F 1/60; G01F 15/003; G01F 15/005; G05D 7/0635
See application file for complete search history.

(56) References Cited

U.S. PATENT DOCUMENTS 2,832,367 A * 4/1958 Au Werter ........... G05D 7/0193
                                                    137/112
3,555,901 A    1/1971 Delatorre et al.
(Continued)

OTHER PUBLICATIONS

Search Report and Written Opinion for Italian Application No. 102020000021415, dated Jun. 14, 2021, 8 pages.
(Continued)

*Primary Examiner* — Paul M. West
(74) *Attorney, Agent, or Firm* — CANTOR COLBURN LLP

(57) ABSTRACT

A system for measuring the flow rate of a fluid medium includes an input line of a fluid medium, elements for measuring the flow rate of the fluid medium in transit which are interposed between the input line and the output line, and an electronic unit functionally associated with the elements for measuring.

The elements for measuring include at least two connecting lines arranged in parallel between the input line and the output line, and a flowmeter in fluid communication with each one of the connecting lines. A corresponding interval of measurable flow rate values stored in the electronic unit is associated with each flowmeter.

13 Claims, 9 Drawing Sheets

(56) References Cited

U.S. PATENT DOCUMENTS

| 4,561,458 A | * | 12/1985 | Hoffmann | G01F 13/00 137/110 |
|---|---|---|---|---|
| 2009/0205400 A1 | | 8/2009 | Mcpeak | |
| 2012/0085434 A1 | | 4/2012 | Powanda | |
| 2018/0024026 A1 | | 1/2018 | Proulx et al. | |
| 2020/0253110 A1 | | 8/2020 | Schlipf et al. | |

OTHER PUBLICATIONS

Australian Office Action for Australian Application No. 2021339086, dated Mar. 26, 2024, 3 pages.

* cited by examiner

SYSTEM FOR MEASURING THE FLOW RATE OF A FLUID MEDIUM

CROSS-REFERENCE TO RELATED APPLICATIONS

This application is a 35 U.S.C. § 371 National Stage patent application of PCT/IB2021/058206 filed 9 Sep. 2021, which claims the benefit of Italian patent application 102020000021415 filed 10 Sep. 2020, the disclosures of which are incorporated herein by reference in their entirety.

TECHNICAL FIELD

The present disclosure relates to a system for measuring the flow rate of a fluid medium.

BACKGROUND

Various applications are known in the agricultural, industrial and civil sectors in which a precise and fast measurement of the flow rate of a fluid medium is required in order to allow an adequate feedback control thereof.

In the agricultural sector, for example, modern spraying and weeding machines that apply so-called "precision farming" methods require accurate dosage of the plant protection products delivered as a function of the characteristics of the area to be treated.

Such machines substantially consist of a tractor which carries or tows through the area to be treated a spraying bar which bears a plurality of dispensing nozzles fed with a liquid to be distributed in a controlled manner. Therefore, dispensed flow rate distribution measurement systems integrated in feedback control circuits are used which monitor the value of the actual dispensed flow rate, compare it with that of the required flow rate and, where necessary, actuate the components of the hydraulic circuit in order to correct the actual dispensed flow rate.

Furthermore, such machines can be equipped with electronic management and control units associated with systems for geolocation of the current position in the area to be treated. The required flow rate values are generally pre-defined on the basis of specific prescription maps related to the area to be treated, which are set in the electronic management and control unit, and can vary abruptly during the execution of the treatment also depending on the advancement speed and on the possible closure of one or more sections of the spraying bar.

For these applications, the required flow rate may vary in just a few seconds from the maximum value (for example of the order of magnitude of 200 l/min) to the minimum value (for example of the order of magnitude of 0.5 l/min) depending on the current position of the agricultural machine; therefore, it is necessary to provide a flow rate measurement system that is reliable and precise as the actual flow rate varies and with the shortest possible response times so as to avoid penalizing the effectiveness of feedback control.

Therefore, various methods are known for measuring the actual flow rate of the dispensed liquid.

For example, a first operating method is known which consists in performing an indirect measurement by means of adapted transducers that detect the actual pressure of the liquid in the circuit, from which the value of the actual flow rate is obtained by applying theoretical formulas containing specific parameters of the nozzles in use (number and flow rate). This known solution is relatively economical and is characterized by a fairly fast response time, but has poor accuracy, which is moreover affected by the state of efficiency of the nozzles in use.

A second known operating method consists in using conventional flowmeters for agricultural machines adapted to perform a direct measurement of the dispensed flow rate. This system is fairly accurate and has a rather fast response time, but is penalized by a limited reading range.

To obviate this drawback, it is known to divide the flow fed to the spraying bar into multiple sections, each of which is provided with a respective flowmeter. The overall flow rate is given by the sum of the values measured by the individual flowmeters, which operate in parallel with each other. Even this solution, however, is not free from drawbacks, which include the fact that the large number of flowmeters used increases the production cost and complicates the architecture of the electronic circuits to be provided to interface them with the electronic management and control unit.

As an alternative, in order to extend the range of obtainable measurements, it is possible to use industrial type flowmeters, characterized by high precision, but with much higher costs and excessively long response times.

A third known operating method consists in carrying out a mixed measurement using both flowmeters for agricultural machines and pressure transducers.

In this case, it is possible to extend the range of measurements that can be obtained, but with higher production costs than when using only flowmeters and with a degree of accuracy that is in any case limited by the indirect method applied to obtain the actual flow rate value.

SUMMARY

The aim of the present disclosure is to eliminate the above mentioned drawbacks of the background art by devising a system for measuring the flow rate of a fluid medium that allows to obtain a wide range of obtainable measurements, with a good degree of reliability, fast response times and low production costs.

Within this aim, the present disclosure provides a degree of reliability that is as constant as possible in the range of obtainable measurements.

the present disclosure also allows its integration in feedback control systems and its interfacing with electronic management and control units without entailing structural complications.

The present disclosure is further applied in agricultural machines that operate according to so-called precision farming operating methods, such as spraying bars.

The present disclosure provides a structure that is simple, relatively easy to provide in practice, safe in use, effective in operation, and having a relatively low cost.

This aim and these and other advantages which will become better apparent hereinafter are all achieved by providing the present system for measuring the flow rate of a fluid medium that has the characteristics stated in claim 1 and is optionally provided with one or more of the characteristics according to the subsequent dependent claims.

BRIEF DESCRIPTION OF THE DRAWINGS

Further characteristics and advantages of the present disclosure will become better apparent from the detailed description of some preferred but not exclusive embodiments of a system for measuring the flow rate of a fluid medium, illustrated by way of non-limiting example in the accompanying drawings, wherein.

DETAILED DESCRIPTION OF THE DRAWINGS

Figure 1:
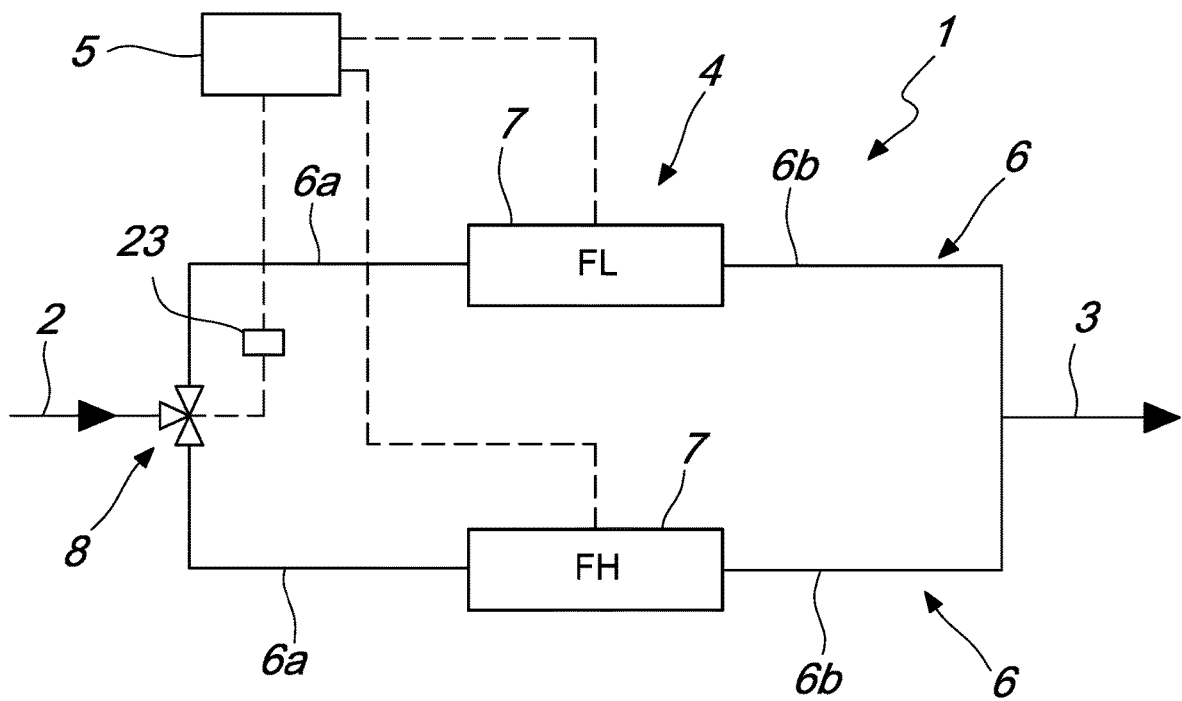
FIGS. 1-4 are schematic circuit diagrams respectively of a first, a second, a third and a fourth embodiment of a system for measuring the flow rate of a fluid medium, according to the disclosure.

With reference to the figures, a system for measuring the flow rate of a fluid medium is generally designated by the reference numeral 1.

The system 1 can, therefore, be used to measure the flow rate of a liquid or gas.

Preferably, the system 1 is applied to measure the flow rate of a liquid. In the agricultural sector, for example, the system 1 can be used to measure the flow rate of a liquid containing at least one plant protection product. However, different applications of the system 1 in other sectors, such as the civil or industrial sector, are not excluded.

The system 1 comprises an input line 2 of the fluid medium which, during use, is adapted to be placed in fluid communication with a supply line of said medium, an output line 3 of the fluid medium which, during use, is adapted to be placed in fluid communication with a line for the distribution of said medium, means 4 for measuring the flow rate of the fluid medium in transit which are interposed between the input line 2 and the output line 3, and electronic management and control means 5 functionally associated with the measurement means 4.

According to the disclosure, the measurement means 4 comprise at least two connecting lines 6 arranged in parallel between the input line 2 and the output line 3, and a flowmeter 7 in fluid communication with each one of the connecting lines 6. A corresponding interval of measurable flow rate values stored in the electronic means 5 is associated with each flowmeter 7. The term "stored" is understood to mean that it can be set in the electronic means 5 during construction or directly by the user.

The measurement means 4 further comprise valve means 8 for directional control with at least three ways and at least two operating positions, which are interposed between the at least two connecting lines 6 and the input line 2 or the output line 3 and are adapted to open, in each of the at least two operating positions, the fluid communication between a corresponding connecting line 6 and the input line 2 or the output line 3 in order to render the corresponding flowmeter 7 operational.

The electronic means 5 are functionally associated with the flowmeters 7 and with the valve means 8 and are adapted to hold/switch the operating position of the valve means 8 as a function of the actual flow rate value detected by the flowmeter 7 in use, i.e., that has the corresponding connecting line 6 in fluid communication with the input line 2 or with the output line 3 via the valve means 8, in order to select the flowmeter 7 with which a measurable flow rate value interval comprising the actual detected flow rate value is associated, opening the fluid communication between the corresponding connecting line 6 and the input line 2 or the output line 3.

Preferably, each flowmeter 7 is arranged directly along the corresponding connecting line 6, dividing it in two portions 6a and 6b upstream and downstream. However, different configurations are not excluded in which each flowmeter 7 is in any case arranged in fluid communication, even indirectly, with the corresponding connecting line 6.

For each flowmeter 7 the measurable flow rate value interval corresponds to the measurement range in which the instrument has good precision. In this manner, the system 1 allows to select the flowmeter 7 in use as a function of the actual detected flow rate value, optimizing the precision of the measurement obtained and keeping it constant as the flow rate to be measured varies.

As the flow rate of the fluid medium in transit varies, the reaction times of the system 1 are extremely short, since they correspond substantially to the actuation times of the switching of the valve means 8 if the flowmeter 7 in use is to be changed.

The system 1 substantially allows to select the flowmeter 7 with which to perform the measurement by actuating the valve means 8 so that they assume the operating position in which the corresponding connecting line 6 is placed in fluid communication with the input line 2 or with the output line 3.

The production costs of the system 1 are relatively low, since commercial components in use in the agricultural, civil and industrial sector can be used.

Preferably, the flowmeters 7 can be of the electromagnetic type, such as those normally used in the agricultural sector.

By increasing the number of flowmeters 7 used and of the corresponding connecting lines 6 it is possible to extend the range of the obtainable measurements, keeping in any case the precision of the measurement constant as the flow rate varies.

Preferably, in order to minimize turbulence induced in the flow and optimize the reliability of the measurement performed, the valve means 8 are interposed between at least two connecting lines 6 and the output line 3.

As an alternative, in any case the valve means 8 can be interposed between the input line 2 and the at least two connecting lines 6. In this case, in order to reduce the turbulence in the flow downstream of the valve means 8, in order to avoid compromising the measurement made by the flowmeters 7 when the operating position assumed by the valve means varies, it would be advisable to lengthen the portion 6a of the connecting line 6 interposed between the valve means 8 and each flowmeter 7.

FIG. 1 shows a circuit that corresponds to a first embodiment of the system 1, which comprises two flowmeters 7 arranged along corresponding connecting lines 6 mutually in parallel, with the valve means 8 interposed between the input line 2 and said connecting lines. The valve means 8 comprise a conventional shunt valve with three ways and two operating positions. In each operating position the shunt valve 8 opens the fluid communication of the input line 2 with a corresponding connecting line 6, so that the corresponding flowmeter 7 can detect the flow rate of the fluid medium in transit.

The two flowmeters 7 are characterized by respective measurable flow rate value intervals and in FIGS. 1-2, 6-7, 8-9 the flowmeter 7 designed to measure the lower flow rates is designated by FL and the one designed to measure the higher flow rates is designated by FH.

Figure 2:
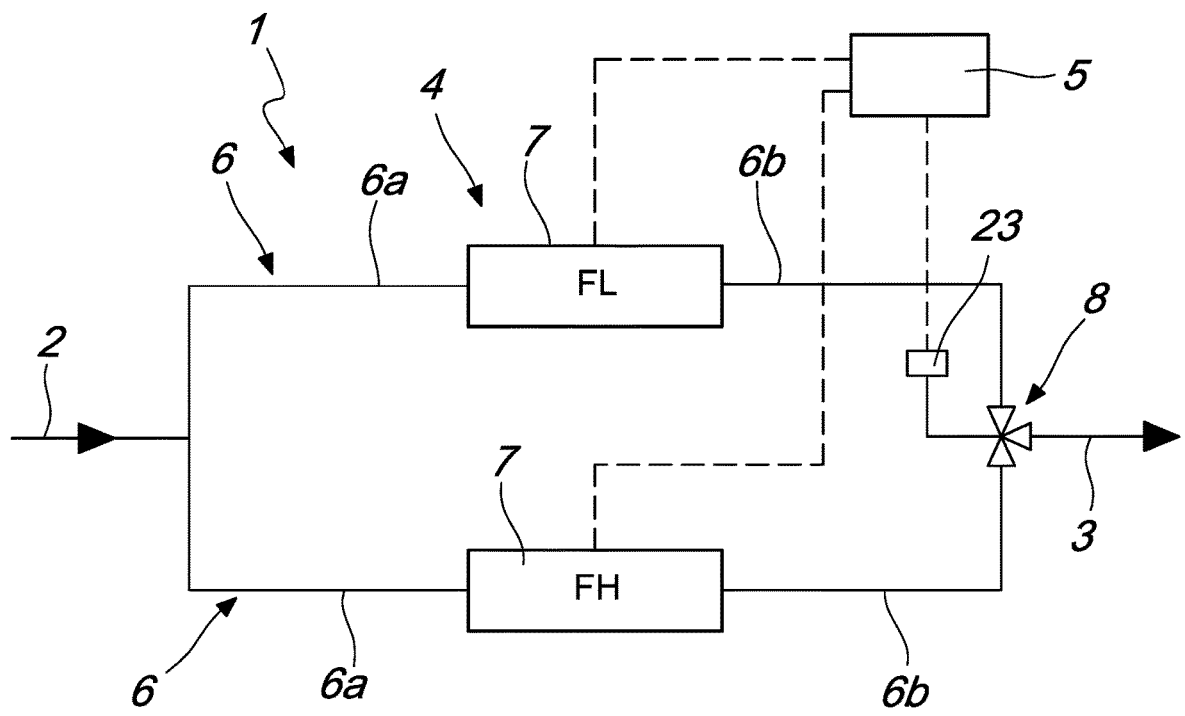

FIG. 2 shows a circuit that corresponds to a second embodiment of the system 1, which comprises two flowmeters 7 arranged along corresponding connecting lines 6 mutually in parallel, with the valve means 8 interposed between the connecting lines and the output line 3. In this case also, the valve means 8 comprise a conventional shunt valve with three ways and two operating positions. In each operating position the shunt valve 8 opens the fluid communication of a corresponding connecting line 6 with the output line 3, so that the corresponding flowmeter 7 can detect the flow rate of the fluid medium in transit.

Figure 3:
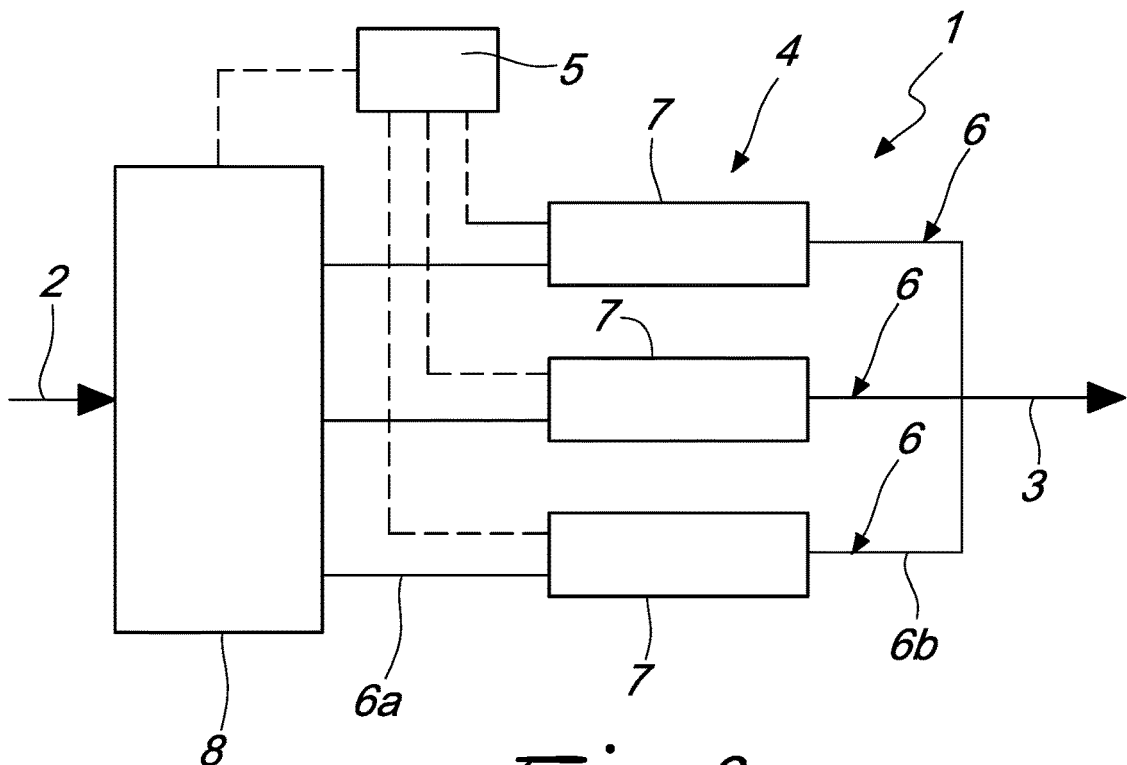

FIG. 3 shows schematically a third embodiment of the system 1, which comprises three flowmeters 7 arranged along corresponding connecting lines 6 mutually in parallel, with the valve means 8 interposed between the input line 2 and the connecting lines. The valve means 8 comprise a conventional shunt valve with four ways and three operating positions, in each of which it allows alternately fluid communication between the input line 2 and a corresponding connecting line 6, activating the corresponding flowmeter 7.

The three flowmeters 7 are characterized by respective measurable flow rate value intervals, a lower one, an intermediate one and a higher one.

Figure 4:
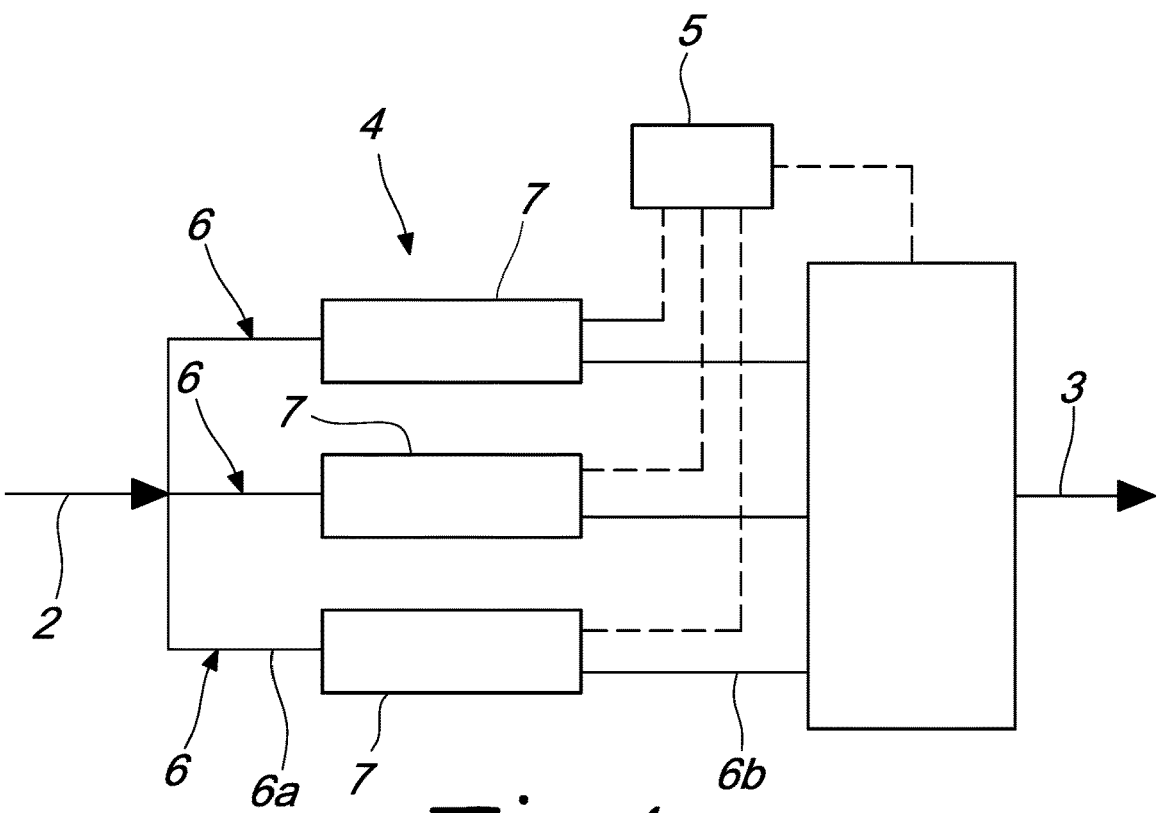

FIG. 4 shows schematically a fourth embodiment of the system 1, which comprises three flowmeters 7 arranged along corresponding connecting lines 6 mutually in parallel, with the valve means 8 interposed between said connecting lines and the output line 3. Said valve means 8 comprise a conventional shunt valve with four ways and three operating positions, in each of which it allows alternately fluid communication between a corresponding connecting line 6 and the output line 3, activating the corresponding flowmeter 7.

The measurement means 4 may have a different number of connecting lines 6 with corresponding flowmeters 7 according to the requirements of the specific application.

Figure 5:
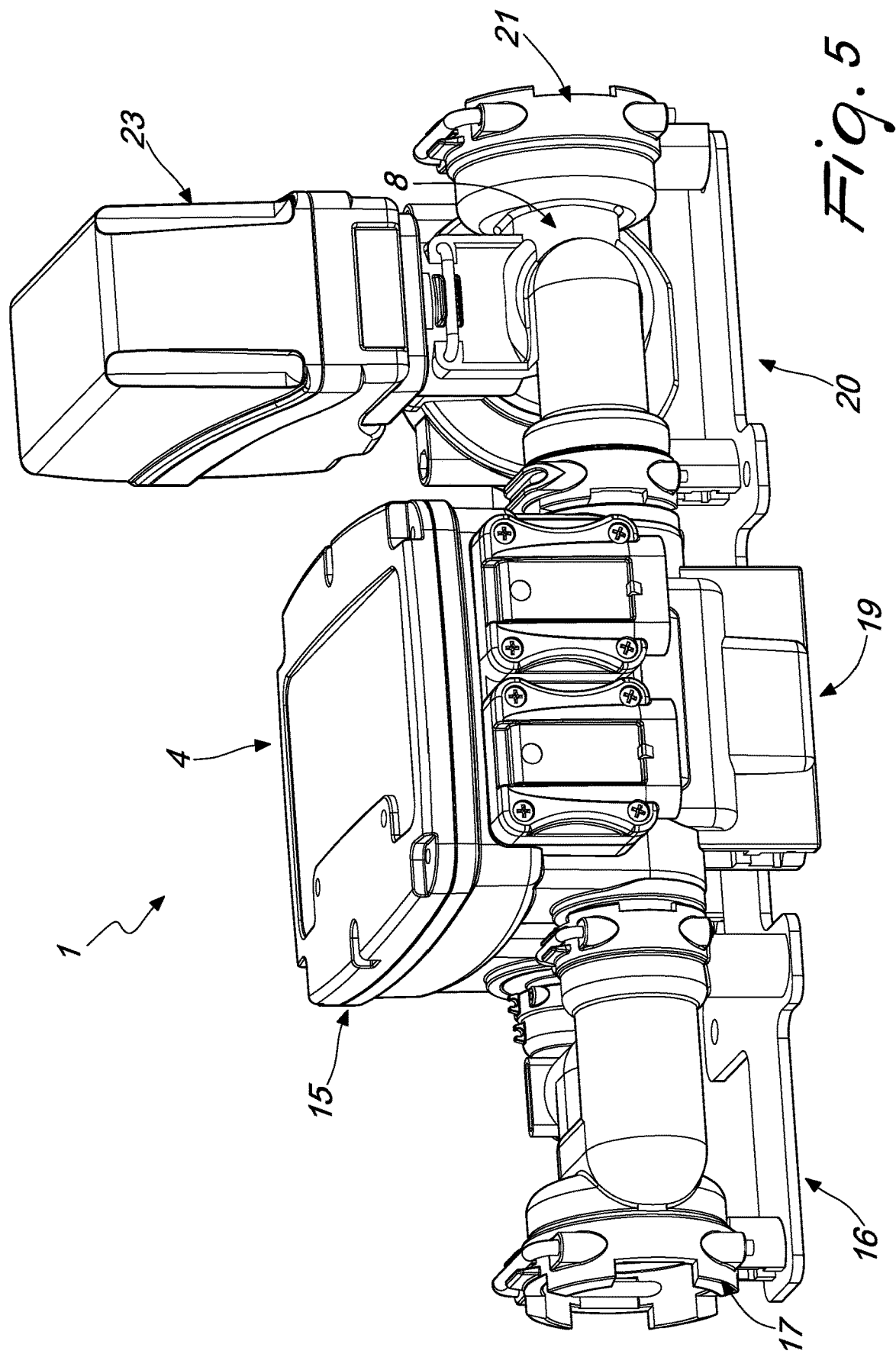
FIG. 5 is a schematic perspective view of a possible constructive form of the second embodiment of the system according to the disclosure.
Figure 6:
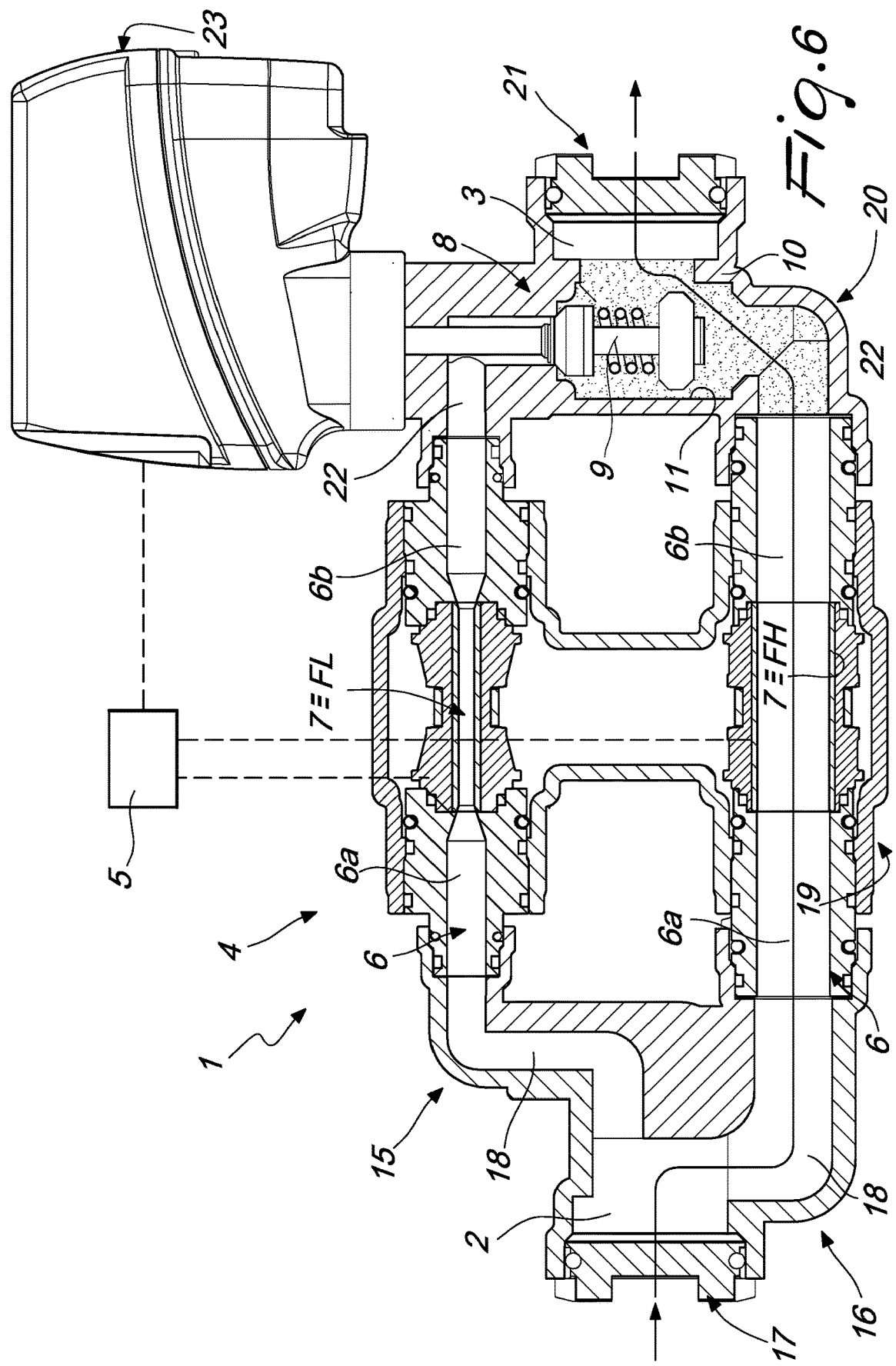
FIGS. 6 and 7 are sectional views, taken along a longitudinal plane of the system of FIG. 5, in a first operating position and in a second operating position, respectively.
Figure 7:
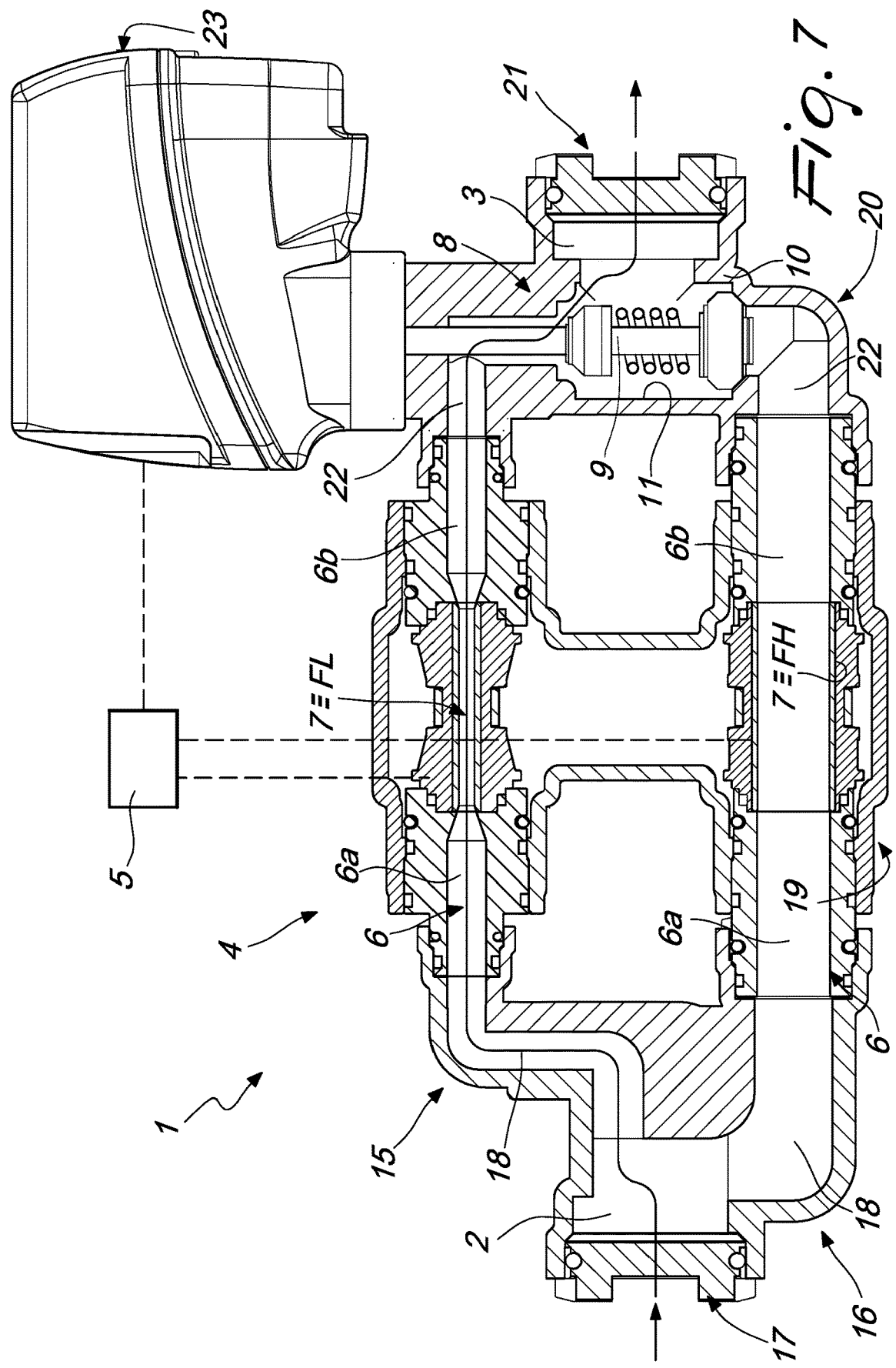

The valve means 8, which are not described in detail since they are of a conventional type, can have a flow control element of the type of a slider 9 which can move by sliding along a valve body 10 which forms a sliding seat 11 in fluid communication with the various fluid medium inlet and outlet ports (FIGS. 5-7).

Figure 8:
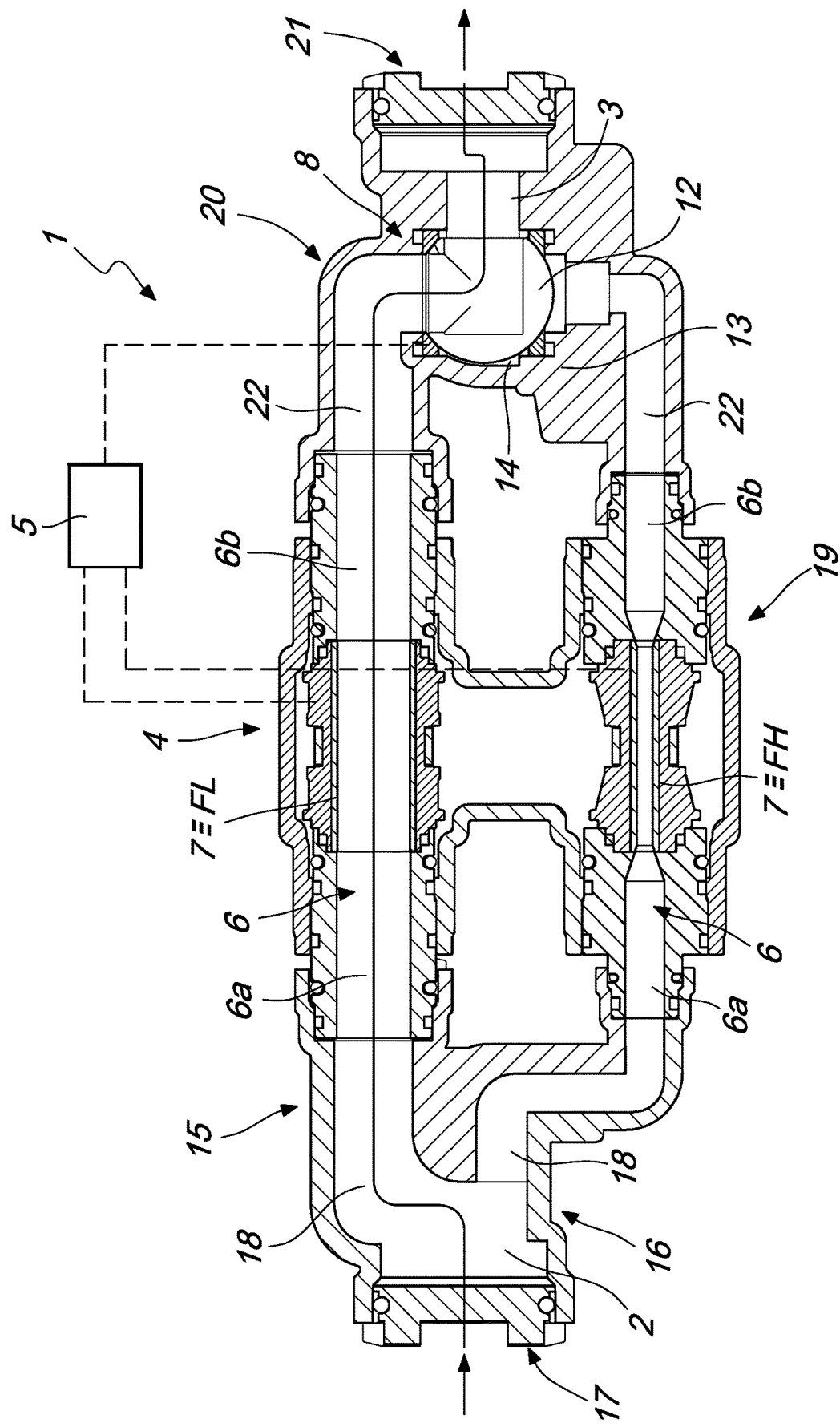
FIGS. 8 and 9 are sectional views, taken along a longitudinal plane, of an alternative constructive form of the second embodiment of the system according to the disclosure, in a first operating position and in a second operating position, respectively.
Figure 9:
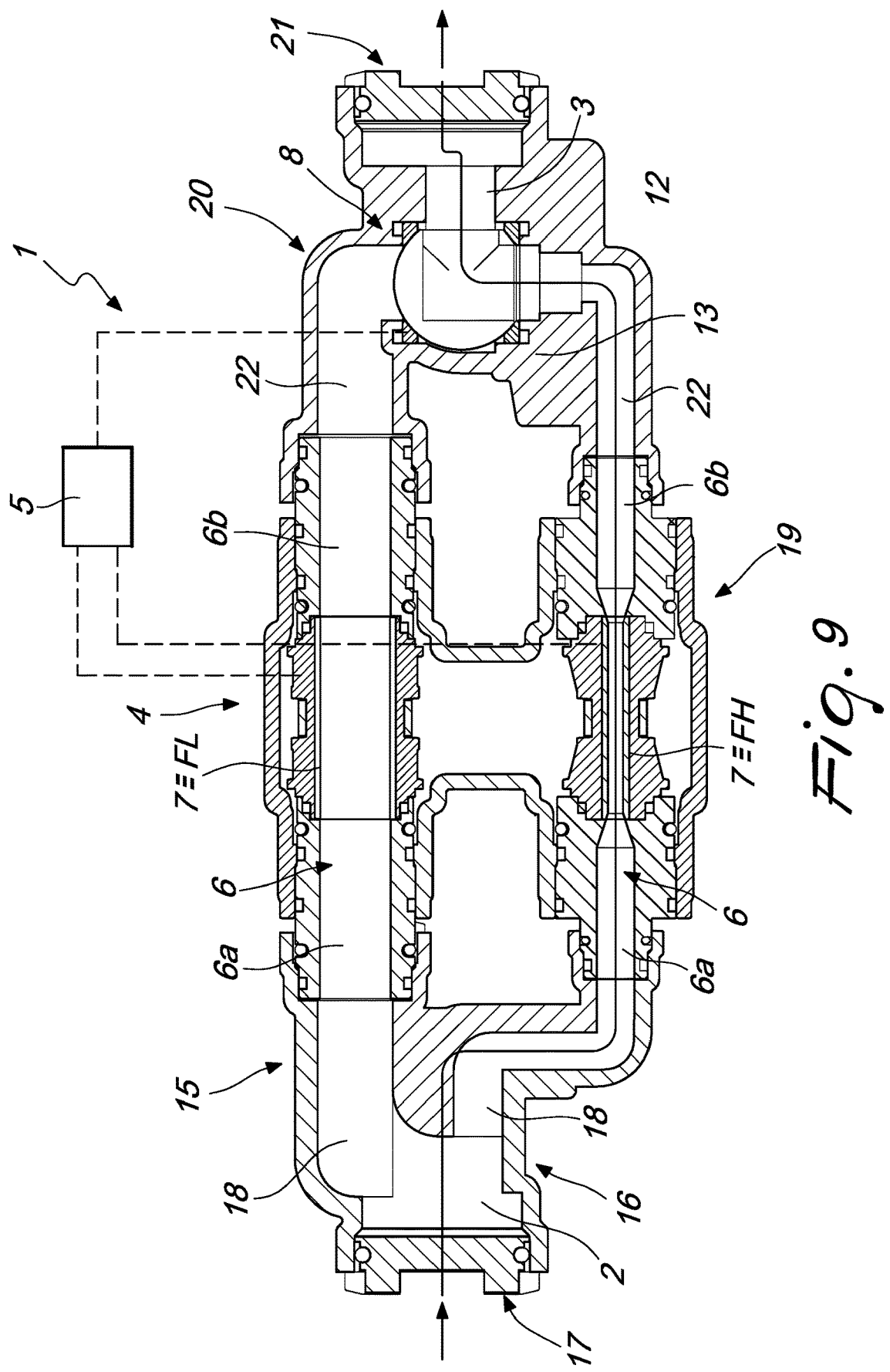

As an alternative, the valve means 8 can have a flow control element of the type of a ball 12 which can move by rotation inside a valve body 13 which forms a rotation seat 14 in fluid communication with the various fluid medium inlet and outlet ports (FIGS. 8-9).

Advantageously, the system 1 can be assembled inside a containment body 15 which comprises a first section 16 provided with an input coupling 17 for connection to the supply line and in which the input line 2 and at least two branching portions 18 that derive from it are formed, a second section 19 in which the at least two connecting lines 6 are formed and the respective flowmeters 7 are accommodated, and a third section 20 provided with an output coupling 21 for connection to the distribution line and in which the output line 3 and at least two connecting portions 22 that converge toward it are formed. Each connecting line 6 is in fluid communication, at the opposite ends, with a respective branching portion 18 and a respective connecting portion 22. The valve means 8 can be accommodated in the first section 16, between the input line 2 and the branching portions 18, or in the third section 20, between the connecting portions 22 and the output line 3.

The number of the provided branching portions 18 and connecting portions 22 may vary as a function of the number of connecting lines 6 with respective flowmeters 7 with which the measurement means 4 are provided.

In this manner, the system 1 has a compact shape which facilitates its installation inside machines or apparatuses designed for specific applications.

For example, FIGS. 5-7 show a possible constructive form of a system 1 in which the measurement means 4 have two connecting lines 6 in parallel with respective flowmeters 7 and the valve means 8 are accommodated in the third section 20. Said valve means 8 have a conventional shunt valve with a slider 9, provided with corresponding sliding actuation means 23 functionally connected to the electronic means 5 to manage the switching of said valve.

FIGS. 6 and 7 show the operation of the system 1 with the shunt valve 8 in the two operating positions.

In FIG. 6 the shunt valve 8 is in a first operating position and opens the fluid communication between the connecting line 6 arranged in a lower region in the figure and the output line 4, so that the electronic means 5 read the actual flow rate value detected by the corresponding flowmeter 7, adapted to detect higher flow rates than the other one.

In FIG. 7 the shunt valve 8 is in a second operating position and opens the fluid communication between the connecting line 6 arranged in an upper region in the figure and the output line 4, so that the electronic means 5 read the actual flow rate value detected by the corresponding flowmeter 7, adapted to detect flow rates that are lower than the other one.

FIGS. 8 and 9 show an alternative constructive form of a system 1 in which the measurement means 4 have two connecting lines 6 in parallel with respective flowmeters 7 and the valve means 8 are accommodated in the third section 20. Such valve means 8 have a conventional shunt valve with a ball 12 provided with corresponding rotational actuation means, not shown, functionally connected to the electronic means 5 for the management of the switching of said valve.

FIGS. 8 and 9 show the operation of the system 1 with the shunt valve 8 in the two operating positions.

In FIG. 8 the shunt valve 8 is in a first operating position and opens the fluid communication between the connecting line 6 arranged in an upper region in the figure and the output line 4, so that the electronic means 5 read the actual flow rate value detected by the corresponding flowmeter 7, adapted to detect higher flow rates than the other one.

In FIG. 9 the shunt valve 8 is in a second operating position and opens the fluid communication between the connecting line 6 arranged in a lower region in the figure and the output line 4 so that the electronic means 5 read the actual flow rate value detected by the corresponding flowmeter 7, adapted to detect lower flow rates than the other one.

It should be noted that the measurable flow rate value intervals associated with the flowmeters 7 comprise, in pairs, at least one common value so that the system 1 covers a continuous measurement range.

Preferably, the measurable flow rate value intervals associated with the flowmeters 7 comprise, in pairs, a subinterval of common values, at least one threshold value stored in the electronic means 5 being provided for each subinterval in order to actuate the valve means 8 by activating the selection of the corresponding flowmeter 7. This solution allows to manage the transient step for passing from one flowmeter 7 to the other.

As the number of connection lines 6 with corresponding flowmeters 7 characterized by respective measurable flow rate value intervals increases, it is therefore possible to extend the measurement range of the system 1.

With reference to the first or second embodiment of the system 1, in which the measurement means 4 are provided with two connecting lines 6 provided with corresponding flowmeters 7, the electronic means 5 are programmed to implement the operating method described hereinafter.

For the sake of greater clarity, the following references will be used in the description that follows:

FL to indicate the flowmeter 7 designed to measure the lower flow rate values, characterized by a measurable flow rate value interval $P_{1L}$-$P_{2L}$ stored in the electronic means 5;

FH to indicate the flowmeter 7 designed to measure the higher flow rate values, characterized by a measurable flow rate value interval $P_{1H}$-$P_{2H}$ where $P_{1H}$<$P_{2L}$ and $P_{1L}$<$P_{2L}$ so that the two intervals include a subinterval of common values $P_{1H}$-$P_{2L}$ stored in the electronic means 5;

$P_{UP}$ is a threshold flow rate value set in the electronic means 5 to activate the switching of the valve means 8 from FL to FH and comprised in the value interval $P_{1H}$-$P_{2L}$;

$t_{UP}$ is the duration of a transient for activating the switching from FL to FH;

$P_{DOWN}$ is a threshold flow rate value set in the electronic means 5 to activate the switching of the valve means 8 from FH to FL and is also comprised in the value interval $P_{1H}$-$P_{2L}$. Generally, the value of $P_{DOWN}$ is lower than the value of $P_{UP}$, but they might also coincide;

$t_{DOWN}$ is the duration of a transient for activating the switching from FH to FL;

$P_{EFF}$ is the flow rate detected by the system 1.

It should be noted that the values of $t_{UP}$ e $t_{DOWN}$ can be mutually identical or different and preferably are set as not zero in order to avoid unwanted switchings in the presence of high instability of the measured flow rate.

In no-flow conditions, the electronic means 5 keep the valve means 8 in the operating position in which it opens the fluid communication between the connecting line 6 of the flowmeter 7=FL and the input line 2 or the output line 3 (depending on whether it is the first or second embodiment of the system 1).

The detected flow rate $P_{EFF}$ is in any case zero.

In conditions of detected flow rate $P_{EFF}$ lower than $P_{UP}$, the electronic means 5 keep the valve means 8 in the operating position mentioned above and the detected flow rate $P_{EFF}$ is the one measured by the flowmeter 7-FL, since flow through the flowmeter 7=FH is closed.

When the detected flow rate $P_{EFF}$ increases it reaches the value $P_{UP}$ and remains in this condition for a time at least equal to $t_{UP}$ and the electronic means 5 activate the switching of the valve means 8 in order to open the fluid communication between the connecting line 6 of the flowmeter 7-FH and the input line 2 or the output line 3.

During this step, the flow is gradually shunted from the flowmeter 7=FL to the flowmeter 7=FH, so that the detected flow rate $P_{EFF}$ is given by the sum of the flow rates measured by the flowmeters 7=FL and 7=FH.

When the detected flow rate $P_{EFF}$ is greater than $P_{UP}$, the electronic means 5 keep the valve means 8 in the operating position in which the connecting line 6 of the flowmeter 7=FH is in fluid communication with the input line 2 or the output line 3, the connecting line 6 of the flowmeter 7-FL being instead closed.

The detected flow rate $P_{EFF}$ is the one measured by the flowmeter 7-FH, the flow through the flowmeter 7=FL being closed.

When the flow rate decreases and reaches the value $P_{DOWN}$ and remains in this condition for a time at least equal to $t_{DOWN}$, the electronic means 5 activate the switching of the valve means 8 in order to open the fluid communication between the connecting line 6 of the flowmeter 7=FL and the input line 2 or the output line 3.

During this step the flow is gradually shunted from the flowmeter 7=FH to the flowmeter 7=FL, so that the detected flow rate $P_{EFF}$ is given by the sum of the flow rates measured by the flowmeters 7=FL and 7=FH.

Figure 10:
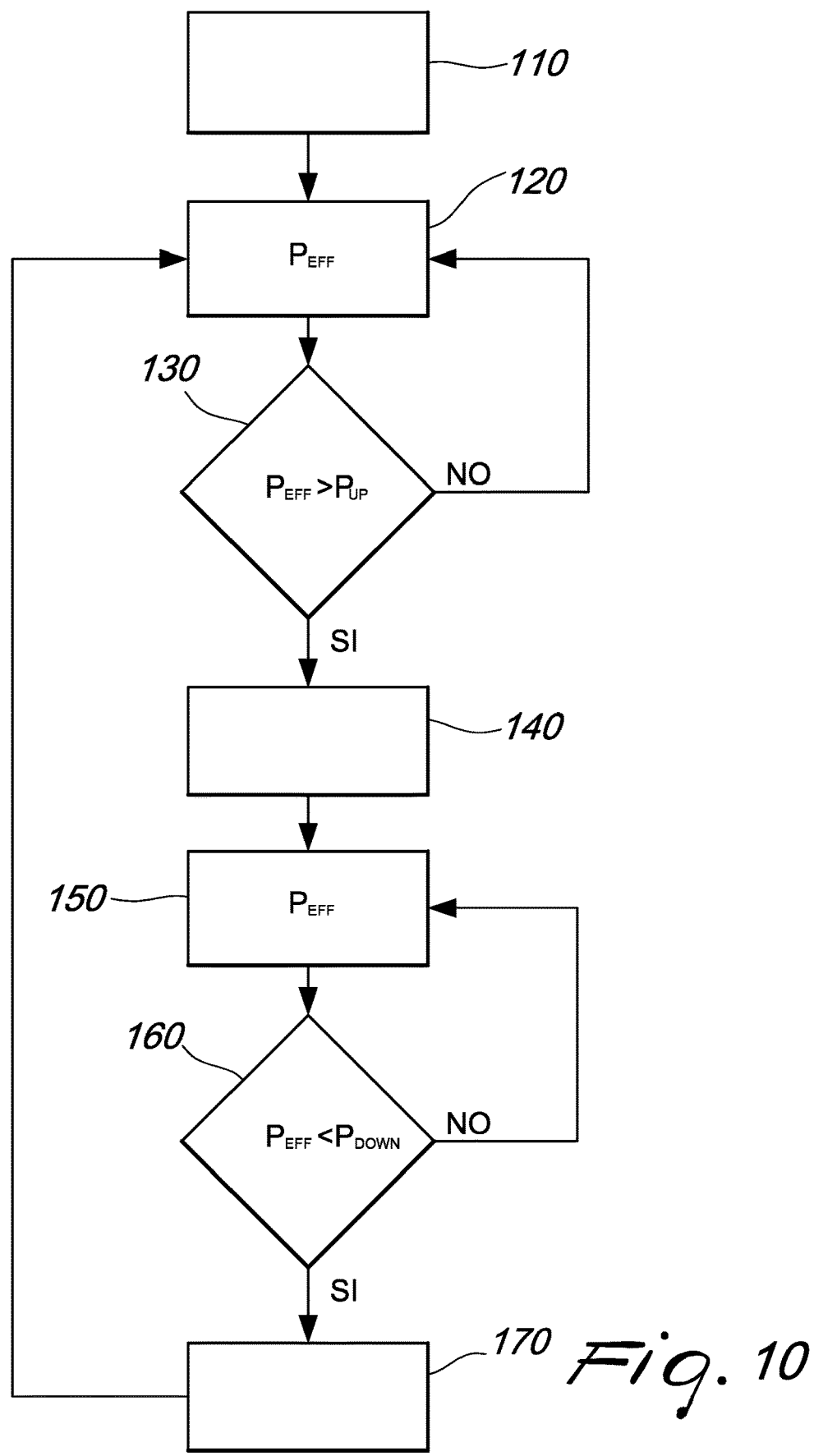
FIG. 10 is a block diagram of the operating method performed by the system according to the disclosure in the first or second embodiment.

With reference to FIG. 10, the operating method performed by the electronic means 5 is as follows.

At the start step 110 of the system 1, the electronic means 5 keep the valve means 8 in the operating position in which the connecting line 6 of the flowmeter 7=FL is in fluid communication with the input line 2 or the output line 3.

The electronic means 5 then implement periodically, with a frequency that is or can be set by the operator, the following cycle of operation:

in the first measurement step 120, the electronic means 5 assume the detected flow rate value $P_{EFF}$ obtained from one or both of the flowmeters 7=FL and/or 7=FH as explained above;

in the first comparison step 130, the detected flow rate value $P_{EFF}$ is compared with the threshold flow rate value $P_{UP}$. If $P_{EFF}$<$P_{UP}$, one returns to step 120 and after a preset time the measurement is repeated. If $P_{EFF}$>$P_{UP}$ for a time at least equal to $t_{UP}$, one proceeds with the following step;

in the first switching step 140, the electronic means 5 actuate the valve means 8 so that they assume the operating position in which the connecting line 6 of the flowmeter 7=FH is in fluid communication with the input line 2 or the output line 3;

in the second measurement step 150, the electronic means 5 assume the detected flow rate value $P_{EFF}$ obtained from one or both of the flowmeters 7=FL and/or 7=FH as explained above;

in the second comparison step 160, the detected flow rate value $P_{EFF}$ is compared with the threshold flow rate value $P_{DOWN}$. If $P_{EFF}$>$P_{UP}$, one returns to step 150 and after a preset time the measurement is repeated. If $P_{EFF}$<$P_{UP}$ for a time at least equal to $t_{DOWN}$, one proceeds with the following step;

in the second switching step 170, the electronic means 5 actuate the valve means 8 so that they assume the operating position in which the connecting line 6 of the flowmeter 7=FL is in fluid communication with the input line 2 or the output line 3.

One then returns to step 120 and the electronic means 5 repeat the measurement cycle described above at time intervals which are set or can be set.

It should be noted that in the normal operation of the disclosure the system 1 obtains the measurement of the actual flow rate from a single flowmeter 7=FH or 7=FL; the values of the flow rates measured by said flowmeters are added together only during transients.

If the measurement means 4 have more than two flowmeters 7 with corresponding connecting lines 6, the corresponding measurable value intervals with the corresponding threshold values are set in the electronic means 5. At each operating cycle, the electronic means 5 compare the detected flow rate value $P_{EFF}$ with the set threshold values and manage the valve means 8 accordingly.

Advantageously, the system 1 can be incorporated in a circuit 100 for feedback control of the flow rate of a fluid medium, comprising a line 101 for the supply of a fluid medium from at least one source 102 provided with a flow rate adjustment system 103, a line 104 for the distribution of said fluid to at least one user 105, an electronic management and control unit 106 adapted to adjust the flow rate of fluid medium that is dispensed to the user 105 as a function of a theoretical flow rate value by acting on the adjustment system 103.

The adjustment system 103, for example, may be constituted by a variable delivery pump with optional adjustment valve or by a fixed delivery pump with an adjustment valve.

In this case, the electronic means 5 are functionally associated with the electronic unit 106 for the selection of the flowmeter 7 to be used as a function of the detected actual flow rate value.

The electronic means 5 can be interfaced with or integrated in the electronic unit 106 according to methods known to the person skilled in the art.

Advantageously, in the agricultural machine sector the circuit 100 can be applied to a user 105 of the type of a spraying bar provided with spraying nozzles 107 for spraying or weeding machines.

The fluid medium treated, in this case, can be a liquid containing at least one plant protection compound and the source 102 may be constituted by a tank arranged on board said machine.

In this case, prescription maps that establish the quantities and methods of distribution of the liquid in the various areas to be treated are stored or set in the electronic unit 106 and said unit, based on a geolocation system of the agricultural machine, manages the adjustment system 103 and the nozzles 107 in order to dispense the correct flow rate of liquid, by means of technologies known to the person skilled in the art.

The use of the system 1 allows to obtain a reliable measurement, with such response times as to not penalize the reliability of the circuit 100 and with low production costs.

Figure 11:
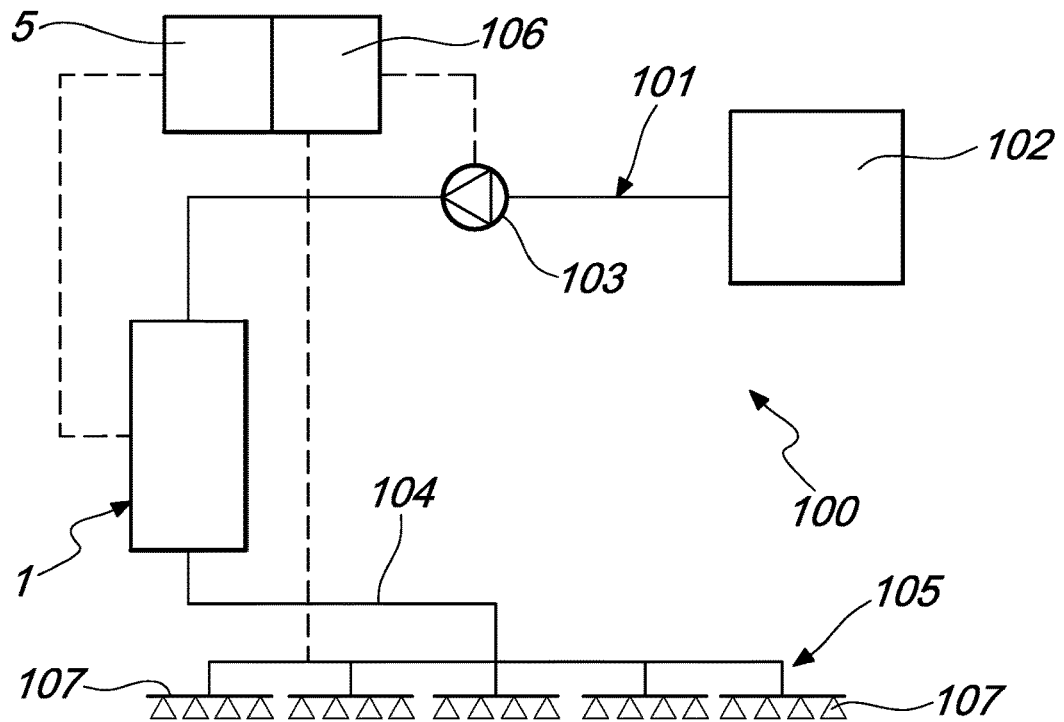
FIG. 11 is a schematic view of a first embodiment of a circuit for feedback control of the flow rate of a fluid medium supplied to a spraying bar which incorporates a system according to the disclosure.

FIG. 11 shows a first embodiment of the circuit 100, which provides a single system 1 arranged along the supply line 101 of the spraying bar 105.

Figure 12:
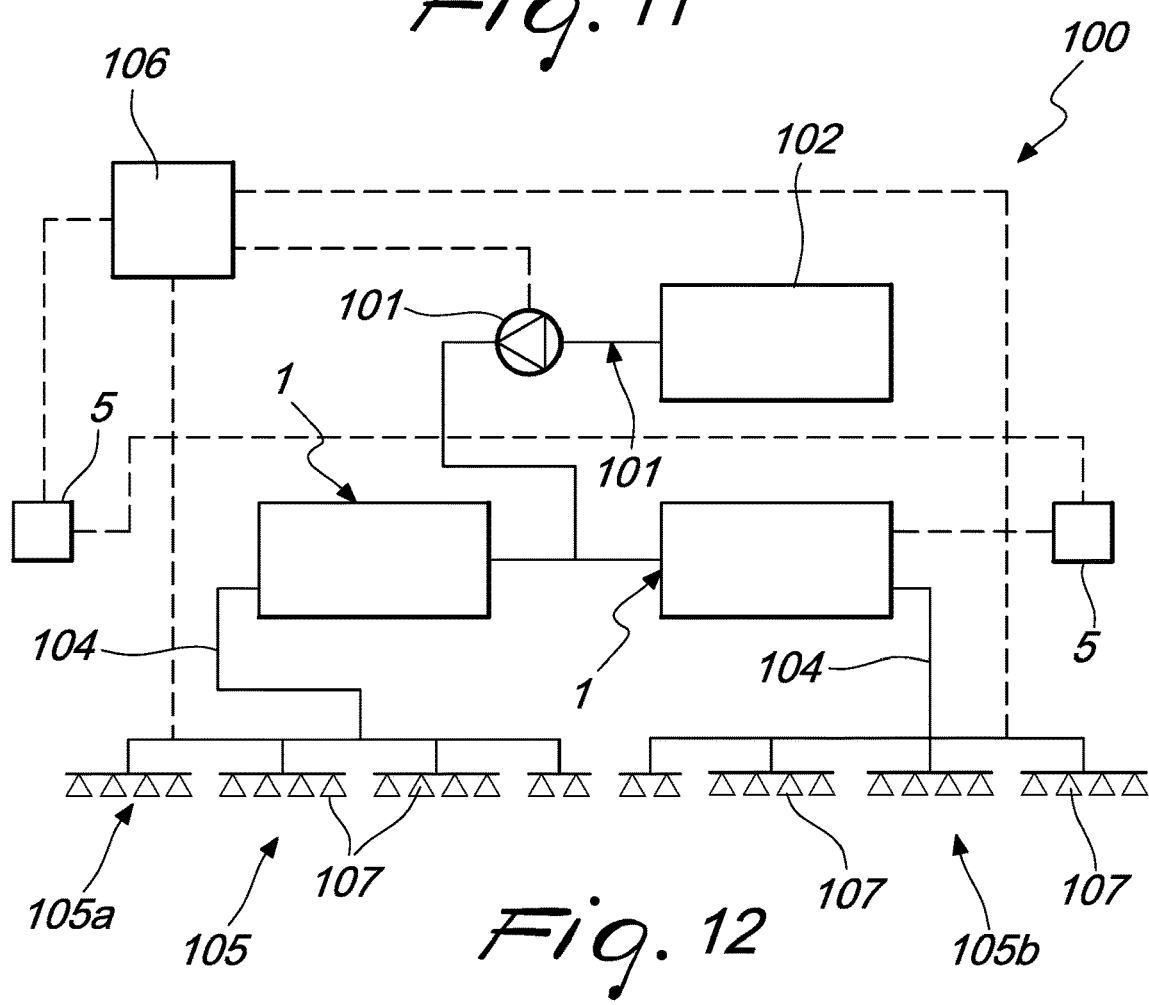
FIG. 12 is a schematic view of a second embodiment of a circuit for feedback control of the flow rate of a fluid medium supplied to a spraying bar which incorporates two systems according to the disclosure.

FIG. 12 shows a variation of the circuit 100, in which the spraying bar 105 is divided into two sections 105a and 105b, each associated with a corresponding system 1. The supply line 101 has two branches 108, each in fluid communication with the input line 2 of a respective system 1. There are also two distribution lines 104, each interposed between a corresponding system 1 and the respective section 105a or 105b.

Preferably, the electronic means 5 of each system 1 are in mutual communication so as to send a single signal to the electronic unit 106.

In practice it has been found that the system according to the disclosure achieves the intended aim and objects and in particular it is noted that the system according to the disclosure allows to obtain a good precision in a wide measurement range, moreover with short response times and low production costs.

Moreover, the system according to the disclosure can have a compact shape and be easy to install.

Furthermore, the system according to the disclosure can be integrated in systems for the feedback control of the flow rate of a fluid medium, ensuring good operating reliability.

The disclosure thus conceived is susceptible of numerous modifications and variations, all of which are within the scope of the accompanying claims.

All the details may furthermore be replaced with other technically equivalent elements.

In practice, the materials used, as well as the contingent shapes and dimensions, may be any according to the requirements without thereby abandoning the protective scope of the claims that follow.

The invention claimed is:

1. A system for measuring a flow rate of a fluid medium, the system comprising:
   an input line of a fluid medium configured to be associated in fluid communication with a supply line of said medium,
   an output line of said fluid medium configured to be associated in fluid communication with a line for distribution of said medium, and
   measurement means configured to measure a flow rate of the fluid medium in transit which are interposed between said input line and said output line,
   electronic management and control means functionally associated with said measurement means,
   wherein said measurement means comprise
   at least two connecting lines arranged in parallel between said input line and said output line,
   a flowmeter in fluid communication with each one of said connecting lines, a corresponding interval of measurable flow rate values stored in said electronic means being associated with each flowmeter,
   valve means configured to directionally control with at least three ways and at least two operating positions, which are interposed between said at least two connecting lines and said input line or said output line and are adapted to open, in each one of said at least two operating positions, a fluid communication between one of said at least two connecting lines and said input line or said output line,
   the electronic management and control means being functionally associated with the flowmeters and with the valve means and being adapted to maintain/switch an operating position of said valve means as a function of a flow rate value detected by the flowmeter having the corresponding connecting line in fluid communication with the input line or the output line by virtue of the valve means, in order to select the flowmeter with which a measurable flow rate value interval comprising the detected flow rate value is associated, opening the fluid communication between the corresponding connecting line and the input line or the output line.

2. The system according to claim 1, wherein said valve means are interposed between said input line and said at least two connecting lines.

3. The system according to claim 1, wherein said valve means are interposed between said at least two connecting lines and said output line.

4. The system according to claim 1, wherein said valve means comprise a slider movable by sliding along a valve body.

5. The system according to claim 1, wherein said valve means comprise a ball movable by rotation inside a valve body.

6. The system according to claim 1, wherein the measurable flow rate value intervals associated with said flowmeters comprise, in pairs, at least one common value.

7. The system according to claim 6, wherein the measurable flow rate value intervals associated with said flowmeters comprise, in pairs, a subinterval of common values, at least one threshold value stored in said electronic means in order to activate a selection of the corresponding flowmeter being provided for each subinterval.

8. The system according to claim 1, wherein said at least two flowmeters are electromagnetic.

9. The system according to claim 1, further comprising a containment body which comprises a first section provided with an input coupling and in which said input line and at least two branching portions that derive from said input line are formed, a second section in which said at least two connecting lines are formed and the respective flowmeters are accommodated, and a third section provided with an output coupling and in which said output line and at least two connecting portions that converge toward said output line are formed, each connecting line being in fluid communication at opposite ends thereof with respective branching portions and connecting portions and the valve means being accommodated in said first section or said third section.

10. The system according to claim 9, wherein said valve means are accommodated in said first section, between said input line and said at least two branching portions.

11. The system according to claim 9, wherein said valve means are accommodated in said third section, between said at least two connecting portions and said output line.

12. A circuit for feedback control of a flow rate of a fluid medium, the circuit comprising: at least one line for supply of a fluid medium from at least one source provided with a flow rate adjustment system, at least one line for the distribution of said fluid to at least one user, an electronic management and control unit adapted to adjust the flow rate of fluid medium that is delivered to said at least one user as a function of a theoretical flow rate value by acting on said adjustment system, and further comprising at least one system according to claim 1 having the corresponding electronic management and control means functionally associated with said electronic unit for a selection of the flowmeter to be used as a function of a detected flow rate value.

13. The circuit according to claim 12, wherein said user comprises at least one spraying bar.

* * * * *